(12) United States Patent
Anderson

(10) Patent No.: US 8,350,928 B2
(45) Date of Patent: *Jan. 8, 2013

(54) METHOD AND APPARATUS FOR AUTOMATICALLY CATEGORIZING IMAGES IN A DIGITAL CAMERA

(75) Inventor: Eric C. Anderson, San Jose, CA (US)

(73) Assignee: KDL Scan Deisgns LLC, Dover, DE (US)

( * ) Notice: Subject to any disclaimer, the term of this patent is extended or adjusted under 35 U.S.C. 154(b) by 110 days.

This patent is subject to a terminal disclaimer.

(21) Appl. No.: 12/576,702

(22) Filed: Oct. 9, 2009

(65) Prior Publication Data

US 2010/0026846 A1 Feb. 4, 2010

Related U.S. Application Data

(63) Continuation of application No. 11/158,658, filed on Jun. 21, 2005, now Pat. No. 7,602,424, which is a continuation-in-part of application No. 09/430,235, filed on Oct. 29, 1999, now Pat. No. 6,914,625, which is a continuation-in-part of application No. 09/121,760, filed on Jul. 23, 1998, now abandoned.

(51) Int. Cl.
H04N 5/76 (2006.01)
(52) U.S. Cl. .............. 348/231.99; 348/231.2; 348/231.6
(58) Field of Classification Search .................. None
See application file for complete search history.

(56) References Cited

U.S. PATENT DOCUMENTS

| | | |
|---|---|---|
| 3,814,227 A | 6/1974 | Hurd, III et al. |
| 3,971,065 A | 7/1976 | Bayer |
| 4,337,479 A | 6/1982 | Tomimoto |
| 4,364,650 A | 12/1982 | Terashita et al. |
| 4,470,067 A | 9/1984 | Mino |
| 4,685,001 A | 8/1987 | Martin |
| 4,736,224 A | 4/1988 | Watanabe et al. |
| 4,739,409 A | 4/1988 | Baumeister |
| 4,888,812 A | 12/1989 | Dinan et al. |
| 5,016,107 A | 5/1991 | Sasson et al. |
| 5,027,150 A | 6/1991 | Inoue et al. |
| 5,057,924 A | 10/1991 | Yamada et al. |
| 5,065,246 A | 11/1991 | Takemoto et al. |
| 5,072,823 A | 12/1991 | Yamada et al. |
| 5,077,582 A | 12/1991 | Kravette et al. |

(Continued)

FOREIGN PATENT DOCUMENTS

WO 0005875 3/2000

OTHER PUBLICATIONS

Martyn Williams, Review-NEC PC-DC401 Digital Still Camera, AppleLink Newbytes, Mar. 15, 1996, pp. 1-3.

(Continued)

*Primary Examiner* — Luong T Nguyen
(74) *Attorney, Agent, or Firm* — Stolowitz Ford Cowger LLP

(57) ABSTRACT

A method and apparatus for automatically categorizing images in a digital camera is provided. In one aspect, image data is captured by a digital camera. Image data analysis is performed on the captured image data by the digital camera to automatically generate a category tag to which the captured image data may relate. The generated category tag is stored in association with the captured image data for categorizing the captured image data.

28 Claims, 10 Drawing Sheets

U.S. PATENT DOCUMENTS

| | | |
|---|---|---|
| 5,153,729 A | 10/1992 | Saito |
| 5,153,730 A | 10/1992 | Nagasaki et al. |
| 5,164,831 A | 11/1992 | Kuchta et al. |
| 5,218,459 A | 6/1993 | Parulski et al. |
| 5,220,420 A | 6/1993 | Hoarty et al. |
| 5,231,511 A | 7/1993 | Kodama et al. |
| 5,247,321 A | 9/1993 | Kazami |
| 5,262,863 A | 11/1993 | Okada |
| 5,262,868 A | 11/1993 | Kaneko et al. |
| 5,335,072 A | 8/1994 | Tanaka et al. |
| 5,355,165 A | 10/1994 | Kosonocky et al. |
| 5,359,427 A | 10/1994 | Sato |
| 5,392,462 A | 2/1995 | Komaki |
| 5,402,170 A | 3/1995 | Parulski et al. |
| 5,475,428 A | 12/1995 | Hintz et al. |
| 5,475,441 A | 12/1995 | Parulski et al. |
| 5,477,264 A | 12/1995 | Sarbadhikari et al. |
| 5,486,853 A | 1/1996 | Baxter et al. |
| 5,493,332 A | 2/1996 | Dalton et al. |
| 5,493,335 A | 2/1996 | Parulski et al. |
| 5,496,106 A | 3/1996 | Anderson |
| 5,521,639 A | 5/1996 | Tomura et al. |
| 5,539,535 A | 7/1996 | Aizawa et al. |
| 5,568,192 A | 10/1996 | Hannah |
| 5,576,757 A | 11/1996 | Roberts et al. |
| 5,581,311 A | 12/1996 | Kuroiwa |
| 5,585,845 A | 12/1996 | Kawamura et al. |
| 5,606,365 A | 2/1997 | Maurinus et al. |
| 5,625,412 A | 4/1997 | Aciu et al. |
| 5,631,701 A | 5/1997 | Miyake |
| 5,633,573 A | 5/1997 | van Phuoc |
| 5,633,678 A | 5/1997 | Parulski et al. |
| 5,633,976 A | 5/1997 | Ogino |
| 5,636,296 A | 6/1997 | Kaneko et al. |
| 5,640,202 A | 6/1997 | Kondo et al. |
| 5,765,029 A | 6/1998 | Schweid et al. |
| 5,796,428 A | 8/1998 | Matsumoto et al. |
| 5,805,215 A | 9/1998 | Mizoguchi |
| 5,806,072 A | 9/1998 | Kuba et al. |
| 5,861,918 A * | 1/1999 | Anderson et al. .......... 348/231.9 |
| 5,867,214 A | 2/1999 | Anderson et al. |
| 5,872,865 A | 2/1999 | Normile et al. |
| 5,889,578 A | 3/1999 | Jamzadeh |
| 5,924,090 A | 7/1999 | Krellenstein |
| 6,028,611 A | 2/2000 | Anderson |
| 6,154,755 A | 11/2000 | Dellert et al. |
| 6,215,523 B1 | 4/2001 | Anderson |
| 6,229,566 B1 | 5/2001 | Matsumoto et al. |
| 6,532,039 B2 | 3/2003 | Anderson |
| 6,538,698 B1 | 3/2003 | Anderson |
| 6,590,608 B2 * | 7/2003 | Matsumoto et al. ....... 348/231.2 |
| 6,628,325 B1 | 9/2003 | Steinberg et al. |
| 6,629,104 B1* | 9/2003 | Parulski et al. ............. 348/231.2 |
| 6,914,625 B1 | 7/2005 | Anderson et al. |
| 7,057,648 B2 | 6/2006 | Parulski et al. |
| 7,193,646 B1 | 3/2007 | Shioji |
| 7,567,276 B2 * | 7/2009 | Anderson et al. .......... 348/231.2 |
| 7,602,424 B2 * | 10/2009 | Anderson ................ 348/231.99 |
| 2001/0012062 A1 | 8/2001 | Anderson |
| 2002/0071028 A1 | 6/2002 | Ezawa |
| 2002/0149676 A1 | 10/2002 | Hatori |

OTHER PUBLICATIONS

Stolowitz Ford Cowger LLP; Related Case Listing; Mar. 9, 2012; 2 Pages.

United States Patent and Trademark Office, ISA/US; International Search Report PCT/US99/16008; Sep. 8, 1999; 1 Page.

Kalinke, Thomas et al.; "A Texture-based Object Detection and an Adaptive Model-Based Classification"; IEEE International Conference on Intelligent Vehicles; 1998; pp. 143-148.

Yu et al. "A Visual Search System for Video and Image Databases"; ISBN 0-8186-7819-4; 1997; pp. 517-524.

* cited by examiner

METHOD AND APPARATUS FOR AUTOMATICALLY CATEGORIZING IMAGES IN A DIGITAL CAMERA

CROSS-REFERENCE TO RELATED APPLICATIONS

This application is a continuation of U.S. patent application Ser. No. 11/158,658, titled "SYSTEM AND METHOD FOR AUTOMATIC ANALYSIS AND CATEGORIZATION OF IMAGES IN A DIGITAL CAMERA," (P153CIP2) filed Jun. 21, 2005, to issue as U.S. Pat. No. 7,602,424, which is a continuation-in-part of U.S. patent application Ser. No. 09/430,235, entitled "METHOD AND APPARATUS FOR MANAGING IMAGE CATEGORIES IN A DIGITAL CAMERA TO ENHANCE PERFORMANCE OF A HIGH-CAPACITY IMAGE STORAGE MEDIA," (P153CIP/US) filed on Oct. 29, 1999, now issued as U.S. Pat. No. 6,914,625, which is a continuation-in-part of U.S. patent application Ser. No. 09/121,760 filed on Jul. 23, 1998, entitled "SYSTEM AND METHOD FOR AUTOMATIC ANALYSIS AND CATEGORIZATION OF IMAGES IN AN ELECTRONIC IMAGING DEVICE," (P153CPA/US) now abandoned, all of which are incorporated by reference and all of which are commonly owned with the present application.

FIELD OF THE INVENTION

This invention relates generally to electronic data processing, and relates more particularly to a system and method for the automatic analysis and categorization of images in an electronic imaging device.

BACKGROUND OF THE INVENTION

The efficient manipulation of captured image data is a significant consideration for designers, manufacturers, and users of electronic imaging devices. Contemporary imaging devices such as digital cameras effectively enable users to capture images, assemble or edit the captured images, exchange the captured images electronically, or print a hard copy of the captured images.

As a camera user captures a number of digital images, it typically becomes necessary to sort and categorize the digital images. In some systems, a camera user must resort to the cumbersome and time-consuming task of individually viewing each captured image, identifying various groupings of image categories, and somehow manually tagging each image to specify the particular image category. For example, in Parulski, U.S. Pat. No. 5,633,678, a camera user manually selects a category for a group of images prior to the capture of the images. The camera user must select a new category for each new group of images. Such a manual categorization system is awkward to use and, therefore, does not provide as efficient an imaging device as a camera that features an automatic categorization system.

In other systems, software programs are available to permit the user to create thumbnails (smaller renditions of the captured image) and to place the thumbnails, with references to the original images, into various libraries or category systems. This process may also become very time consuming, especially as the number of captured images or the variety of category types increases.

From the preceding discussion, it becomes apparent that an electronic imaging system that manually analyzes and categorizes any significant number of captured images does not achieve an acceptable degree of efficiency. Therefore, an electronic imaging device that automatically analyzes captured images, and then responsively categorizes the analyzed images into one or more selected image groupings, would clearly provide a significant improvement in efficient functionality for various contemporary electronic imaging technologies.

For all the foregoing reasons, an improved system and method are needed for the automatic analysis and categorization of images in an electronic imaging device.

SUMMARY OF THE INVENTION

A method and apparatus for automatically categorizing images in a digital camera is provided. In one aspect, a digital camera includes a processor that converts raw image data into processed image data at the time of image capture, an analysis module coupled to the processor that analyzes the raw image data at the time of image capture and identifies one or more categories to which each of the images may relate, and category tags that are attached to and stored in each of the images corresponding to the categories. By attaching and storing the category tags with each of the images, the processor can automatically sort the images by their respective categories.

In the preferred embodiment, after the image data is converted into RGB format, selected analysis modules may connect through an RGB insertion point to advantageously analyze the image data at an RGB transition point, in accordance with the present invention. Once a particular analysis module analyzes the final line of the image data, then that analysis module preferably generates any appropriate category tags and stores the generated category tags into a blank category tag location in the image file. The digital camera may then subsequently access the stored category tags to automatically categorize and utilize the individual stored images (which each correspond to a separate image file).

Next, another image processing module preferably performs gamma correction and color space conversion on the image data. The image processing module also preferably converts the color space format of the image data. In the preferred embodiment, the image data is converted into YCC 444 format.

After the image data is converted into YCC 444 format, selected analysis modules may be plugged into a YCC insertion point to analyze the image data at a YCC transition point, in accordance with the present invention. As discussed above, once a particular analysis module analyzes the final line of the image data, then that analysis module preferably generates any appropriate category tags and stores the generated category tags into a blank category tag location in the image file for subsequent use by the camera to automatically categorize captured images. In other embodiments of the present invention, analysis modules may readily analyze image data at any other time or insertion point within the camera.

Next, an image processing module preferably performs a sharpening procedure on the image data, and also may perform a variety of other processing options. Then, an image processing module preferably decimates the image data, and the image data is compressed into a final image format (preferably JPEG.) Next, a file formatter preferably formats the compressed image file, and the resulting image file is finally saved into a removable memory device.

The image file thus includes any appropriate category tags, and the camera may then subsequently utilize the category tags to automatically access selected images, in accordance with the present invention. The present invention therefore provides an efficient system and method for automatically analysis and categorization of captured images in an electronic imaging device.

DESCRIPTION OF THE INVENTION

The present invention relates to an improvement in digital imaging devices, including digital cameras. The following description is presented to enable one of ordinary skill in the art to make and use the invention and is provided in the context of a patent application and its requirements. Although the present invention will be described in the context of a digital camera, various modifications to the preferred embodiment will be readily apparent to those skilled in the art and the generic principles herein may be applied to various other embodiments. That is, any imaging device, which captures image data, could incorporate the features described hereinbelow and that device would be within the spirit and scope of the present invention. Thus, the present invention is not intended to be limited to the embodiment shown, but is to be accorded the widest scope consistent with the principles and features described herein.

The present invention comprises one or more analysis modules that examine captured image files for selected criteria. The analysis modules then responsively generate and store appropriate category tags along with the image file to advantageously enable the imaging device to subsequently access the stored category tags and thereby automatically access desired categories of captured images.

Figure 1:
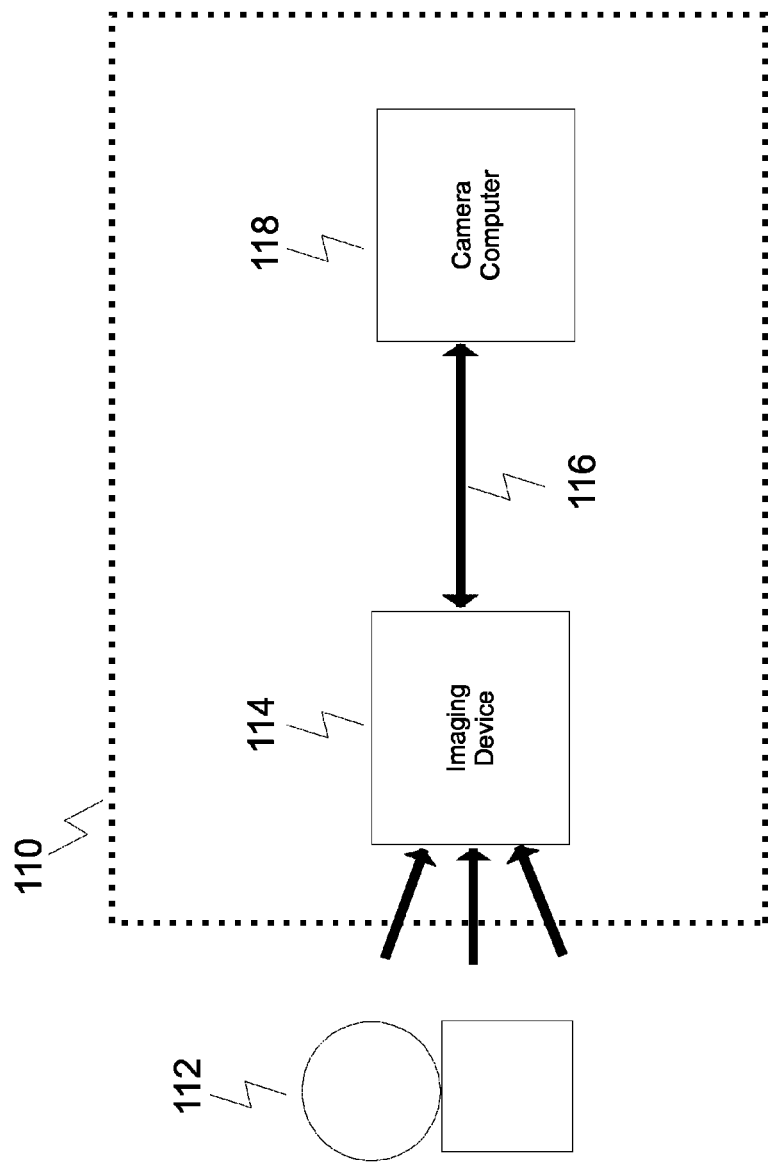
FIG. 1 is a block diagram of one embodiment for a digital camera, according to the present invention.

Referring now to FIG. 1, a block diagram of one embodiment for a digital camera 110 is shown. Camera 110 preferably comprises an imaging device 114, a system bus 116, and a camera computer 118. Imaging capture device 114 may be optically coupled to an object 112 and electrically coupled via system bus 116 to camera computer 118. Once a user has focused imaging capture device 114 on object 112 and instructed camera 110 to capture an image of object 112, camera computer 118 commands imaging capture device 114 via system bus 116 to capture raw image data representing object 112. The captured raw image data is transferred over system bus 116 to camera computer 118, which performs various image-processing functions on the image data. System bus 116 also passes various status and control signals between imaging capture device 114 and camera computer 118.

Figure 2:
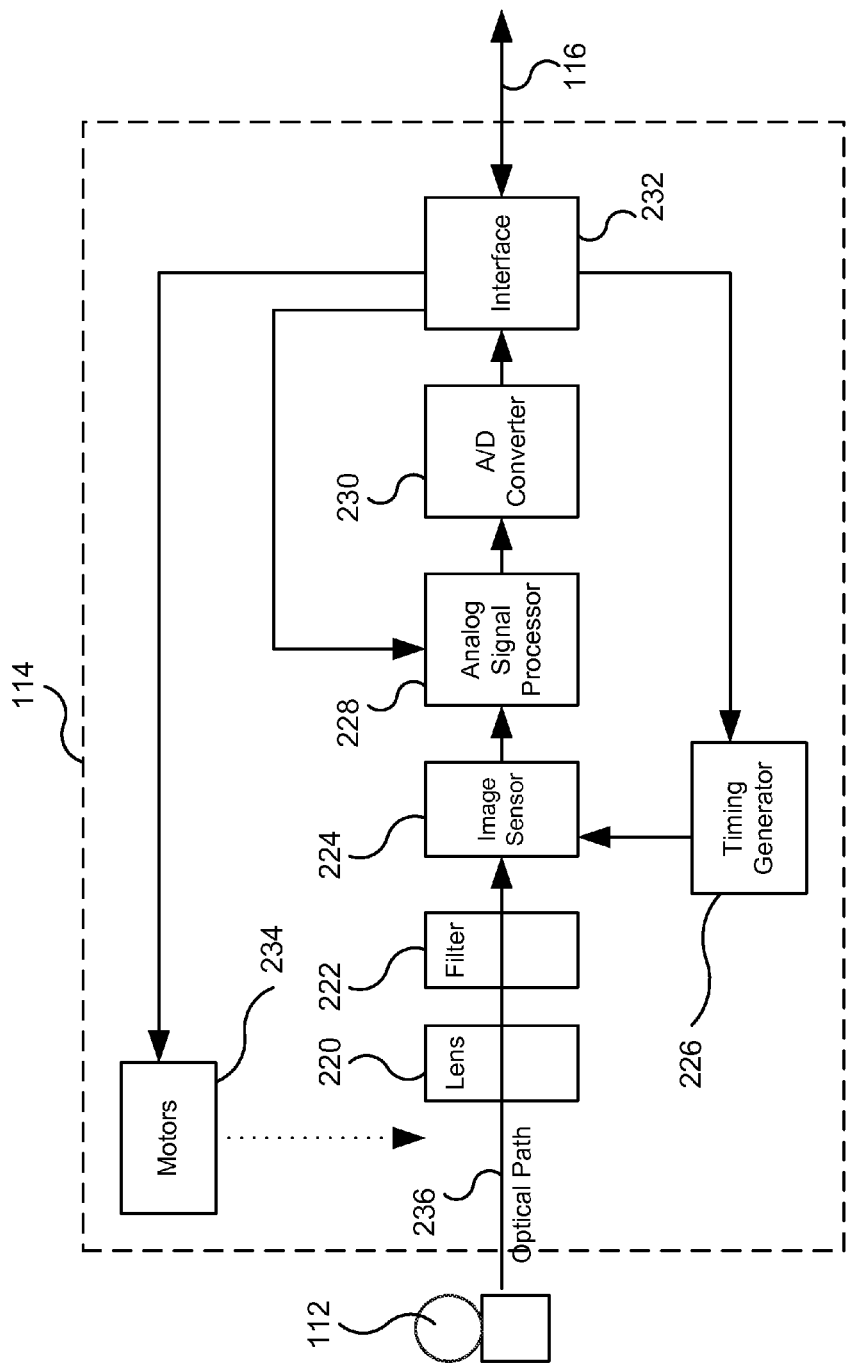
FIG. 2 is a block diagram of one embodiment for the imaging device of FIG. 1, according to the present invention.

Referring now to FIG. 2, a block diagram of one embodiment for imaging device 114 of FIG. 1 is shown. Imaging device 114 preferably comprises a lens 220 having an iris (not shown), a filter 222, an image sensor 224, a timing generator 226, an analog signal processor (ASP) 228, an analog-to-digital (A/D) converter 230, an interface 232, and one or more motors 234 to adjust focus of lens 220. Imaging capture device 114 captures an image of object 112 via reflected light impacting image sensor 224 along optical path 236. Image sensor 224, which is preferably a charged-coupled device (CCD), responsively generates a set of raw image data in CCD format representing the captured image 112. The raw image data is then routed through ASP 228, A/D converter 230, and interface 232. Interface 232 has outputs for controlling ASP 228, motors 234 and timing generator 226. From interface 232, the raw image data passes over system bus 116 to camera computer 118.

Figure 3:
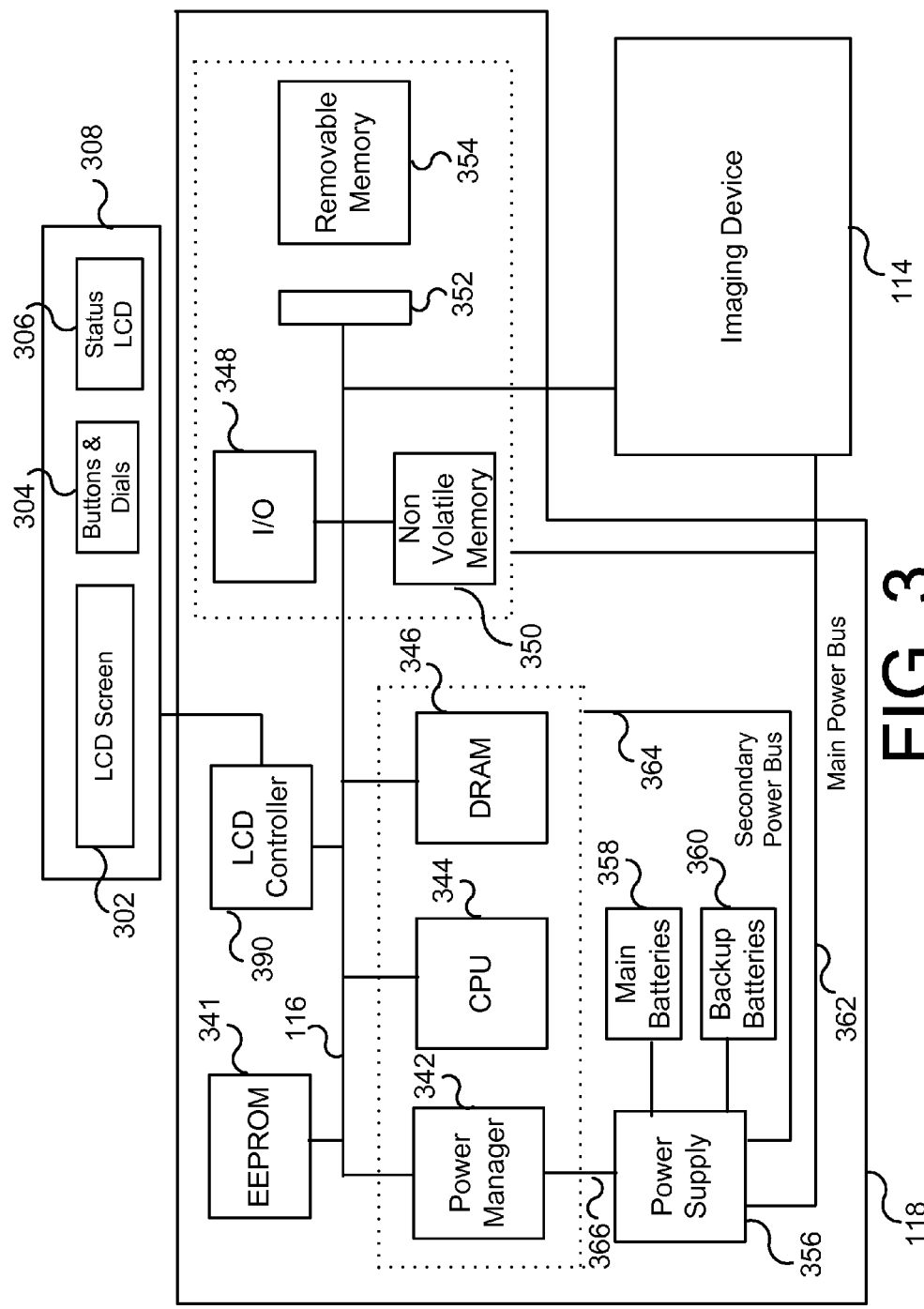
FIG. 3 is a block diagram of one embodiment for the camera computer of FIG. 1.

Referring now to FIG. 3, a block diagram of one embodiment for camera computer 118 of FIG. 1 is shown. System bus 116 provides communication between imaging capture device 114, electrically-erasable programmable read-only memory (EEPROM) 341, optional power manager 342, central processing unit (CPU) 344, dynamic random-access memory (DRAM) 346, camera input/output (I/O) 348, non-volatile memory 350, and buffers/connector 352. Removable memory 354 connects to system bus 116 via buffers/connector 352. In alternate embodiments, camera 110 may also readily be implemented without removable memory 354 or buffers/connector 352.

Power manager 342 communicates with power supply 356 and coordinates power management operations for camera 110. CPU 344 preferably includes a processor device for controlling the operation of camera 110. In the preferred embodiment, CPU 344 is capable of concurrently running multiple software routines to control the various processes of camera 110 within a multi-threading environment. DRAM 346 is a contiguous block of dynamic memory, which may be selectively allocated to various storage functions. LCD controller 390 accesses DRAM 346 and transfers processed image data to LCD screen 302 for display.

Camera I/O 348 is an interface device allowing communications to and from camera computer 118. For example, camera I/O 348 permits an external host computer (not shown) to connect to and communicate with camera computer 118. Camera I/O 348 may also interface with a plurality of buttons and/or dials 304, and an optional status LCD 306, which, in addition to LCD screen 302, are the hardware elements of the camera's user interface 308.

Non-volatile memory 350, which preferably comprises a conventional read-only memory or flash memory, stores a set of computer-readable program instructions to control the operation of camera 110. Removable memory 354 serves as an additional image data storage area and is preferably a non-volatile device, readily removable and replaceable by a camera user via buffers/connector 352. Thus, a user who possesses several removable memories 354 may replace a full removable memory 354 with an empty removable memory 354 to effectively expand the picture-taking capacity of camera 110. In the preferred embodiment of the present invention, removable memory 354 is preferably implemented using a flash disk.

Power supply 356 provides operating power to the various components of camera 110 via main power bus 362 and secondary power bus 364. The main power bus 362 provides power to imaging capture device 114, camera I/O 348, non-volatile memory 350 and removable memory 354, while secondary power bus 364 provides power to power manager 342, CPU 344 and DRAM 346.

Power supply 356 is connected to main batteries 358 and also to backup batteries 360. Camera 110 user may also connect power supply 356 to an optional external power source. During normal operation of power supply 356, main batteries 358 provide operating power to power supply 356 which then provides the operating power to camera 110 via both main power bus 362 and secondary power bus 364. During a power failure mode where main batteries 358 have failed (i.e., when their output voltage has fallen below a minimum operational voltage level), backup batteries 360 provide operating power to power supply 356 which then provides operating power only to the secondary power bus 364 of camera 110.

Figure 4:
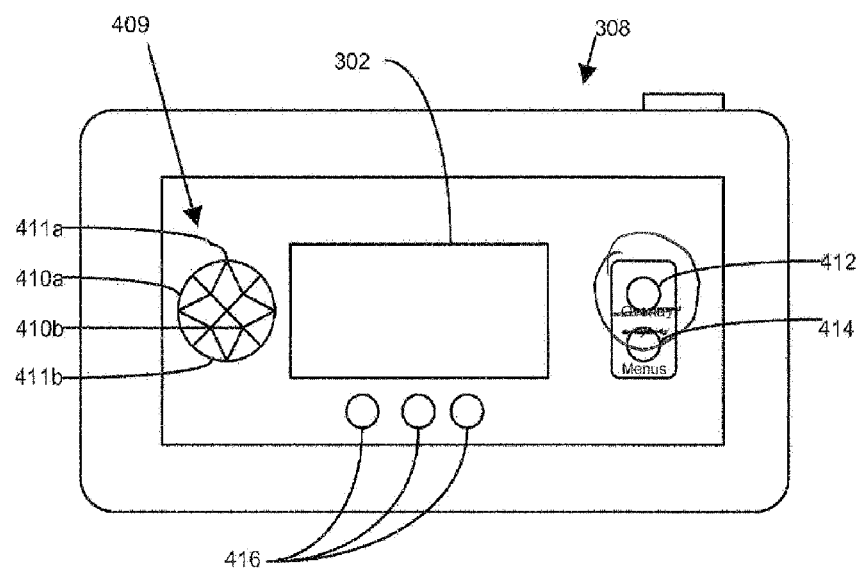
FIG. 4 is a rear elevation view of one embodiment for the FIG. 1 digital camera.

Referring now to FIG. 4, a rear elevation view of one embodiment for camera 110 of FIG. 1 is shown. The FIG. 4 representation depicts hardware components of user interface 308 of camera 110, showing LCD screen 302, user interface 308, a four-way navigation control button 409, an overlay button 412, a menu button 414, and a set of programmable soft keys 416.

User interface 308 includes several operating modes for supporting various camera functions. In the preferred embodiment, operating modes may include capture mode, review mode, play mode, and PC-connect mode. Within capture mode, menu options are available to set-up the categories used during image capture. The user preferably switches between the camera modes by selecting a mode dial (not shown).

Figure 5:
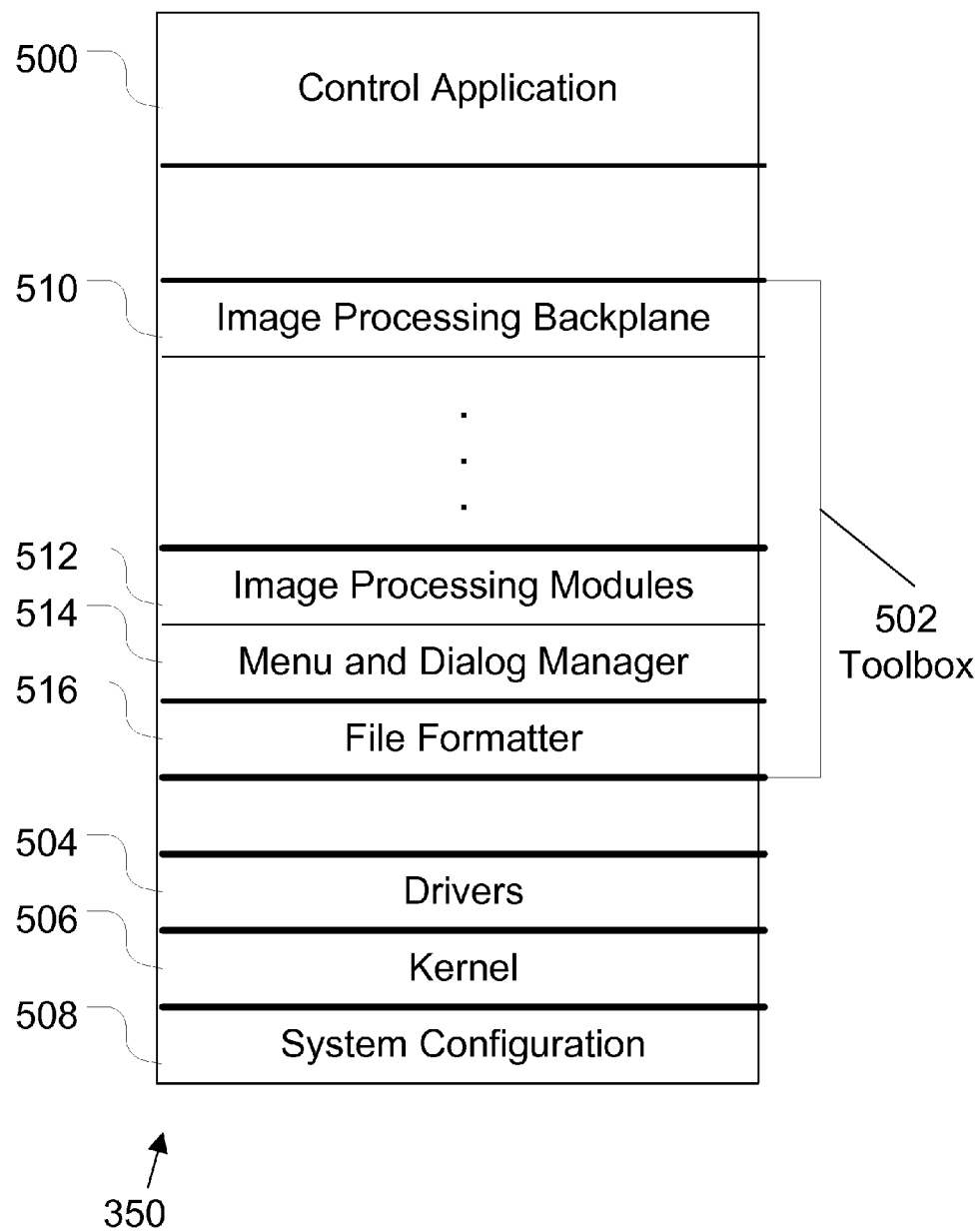
FIG. 5 is a diagram one embodiment for the non-volatile memory of FIG. 3, according to the present invention.

Referring now to FIG. 5, a diagram one embodiment for the non-volatile memory 350 of FIG. 3 is shown. The FIG. 5 diagram includes control application 500, toolbox 502, drivers 504, kernel 506, and system configuration 508. Control application 500 comprises program instructions for controlling and coordinating the various functions of camera 110. Toolbox 502 contains selected function modules including image processing backplane 510, image processing modules 512, menu and dialog manager 514, and file formatter 516.

Image processing backplane 510 includes software routines that coordinate the functioning and communication of various image processing modules 512 and handle the data flow between the various modules. Image processing modules 512 preferably include selectable plug-in software routines that manipulate captured image data in a variety of ways, depending on the particular modules selected. Menu and dialog manager 514 includes software routines which provide information for controlling access to camera control menus and camera control menu items for access to features in camera 110. File formatter 516 includes software routines for creating an image file from the processed image data.

Drivers 504 control various hardware devices within camera 110 (for example, motors 234). Kernel 506 provides basic underlying services for the camera 110 operating system. System configuration 508 performs initial start-up routines for camera 110, including the boot routine and initial system diagnostics.

Figure 6:
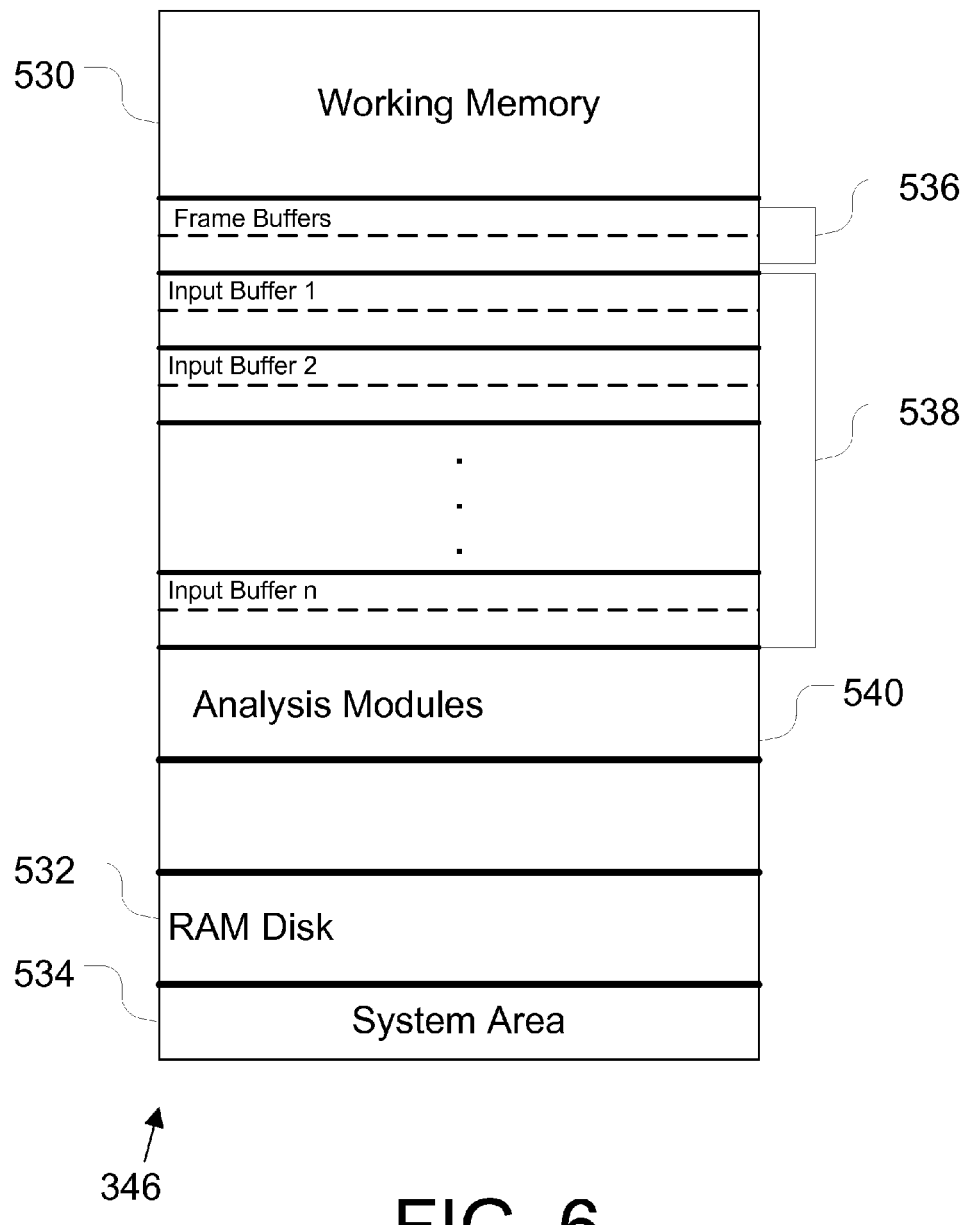
FIG. 6 is a diagram of one embodiment for the dynamic random-access memory of FIG. 3, according to the present invention.

Now referring to FIG. 6, a diagram of one embodiment for dynamic random-access-memory (DRAM) 346 is shown. DRAM 346 includes RAM disk 532, system area 534, analysis modules 540 and working memory 530.

In the preferred embodiment, RAM disk 532 is a memory area used for storing raw and compressed image data and is organized in a "sectored" format similar to that of conventional hard disk drives. A conventional and standardized file system permits external host computer systems, via I/O 348, to recognize and access the data stored on RAM disk 532. System area 534 stores data regarding system errors (e.g., why a system shutdown occurred) for use by CPU 344 to restart computer 118.

Working memory 530 includes stacks, data structures and variables used by CPU 344 while executing the software routines used within camera computer 118. Working memory 530 also includes input buffers 538 for initially storing sets of image data received from imaging device 114 for image conversion, and frame buffers 536 for storing data to display on LCD screen 302.

In accordance with the present invention, analysis modules 540 preferably each include one or more software routines for automatically analyzing and categorizing images. In the FIG. 6 embodiment, analysis modules 540 may be loaded into RAM 346 from removable memory 354 or another external source. Analysis modules 540 further discussed below in conjunction with FIGS. 7 through 10.

Figure 7:
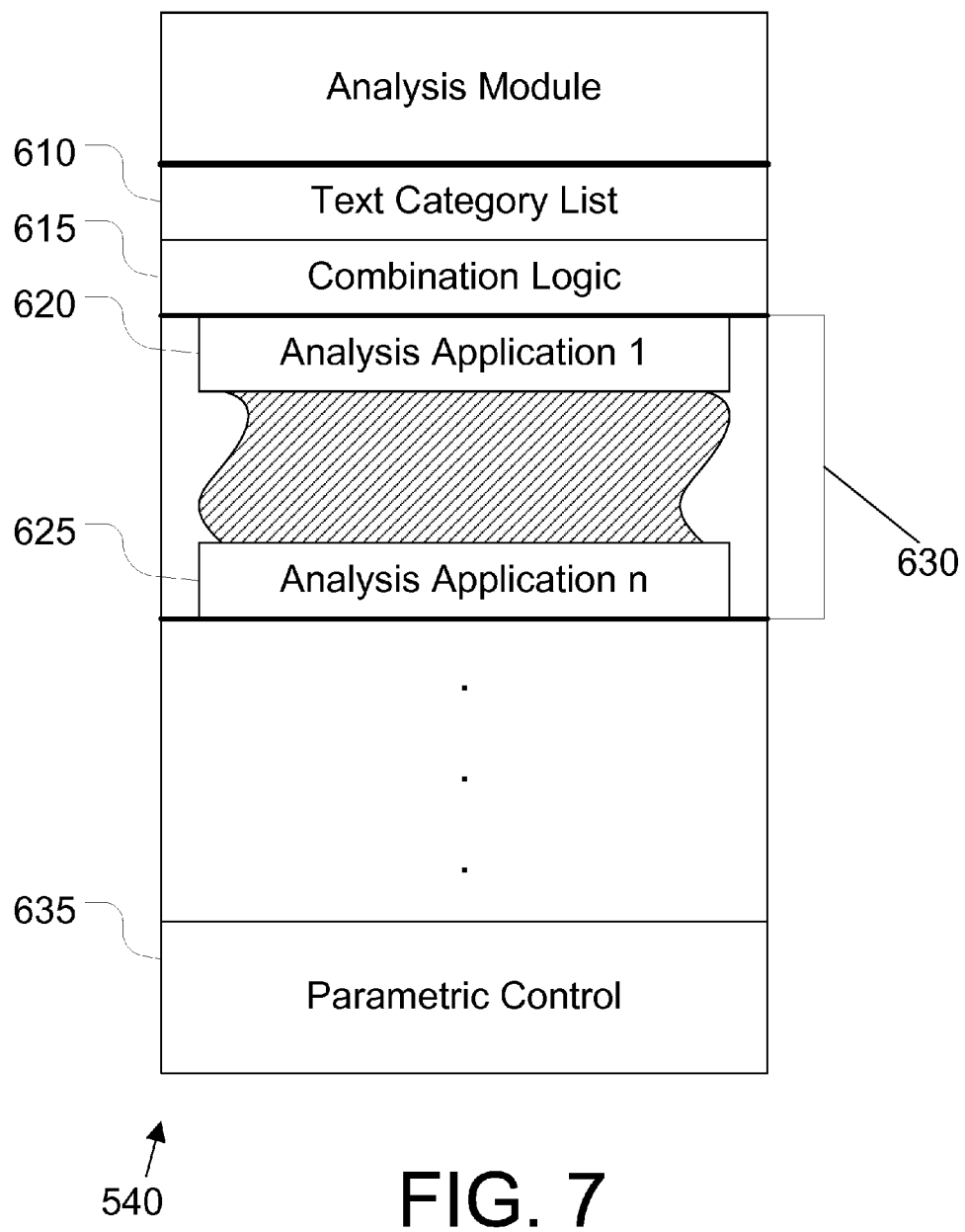
FIG. 7 is a diagram of one embodiment for a single analysis module of FIG. 6, according to the present invention.

Referring now to FIG. 7, a diagram of one embodiment for a single analysis module 540 of FIG. 6 is shown. Analysis module 540 includes text category list 610, combination logic 615, analysis algorithms 630, and parametric control 635.

Text category list 610 is a listing of the various possible image categories available for a given analysis module 540. Combination logic 615 determines how to resolve the results of the image analysis when multiple analysis algorithms 630 are utilized. Parametric control 635 is used to control settable parameters for analysis module 540. For example, analysis module may be turned on/off, or sensitivity settings for analysis module 540 may be controlled with parametric control 635.

Analysis algorithms 630 are a series of software routines ranging from analysis algorithm 1 (620) through analysis algorithm n (625.) Analysis algorithms 630 are each designed to allow analysis module 540 to access and analyze images at various stages in the processing chain of camera 110, in order to gather information about the image for later categorization.

Typically, each analysis algorithm 630 is designed to detect at least one image category. For example, individual analysis algorithms 630 may be designed to detect a person or groups of people based on characteristics like substantial amounts of flesh tones within the image. Individual analysis algorithms 630 may likewise be designed to detect nature scenes from characteristics like substantial green content in the image combined with the relative lack of hard edges. Similarly, categories like city images, water images or indoor images may be detected by characteristic features contained in those images. Once the last line of image data from a given image is processed, analysis module 540 then preferably generates one or more category tags that correspond to the particular image, and the generated category tags are stored as part of the image file. A user of camera 110 may thus readily utilize the category tags to efficiently access and sort images into selected categories.

Figure 8:
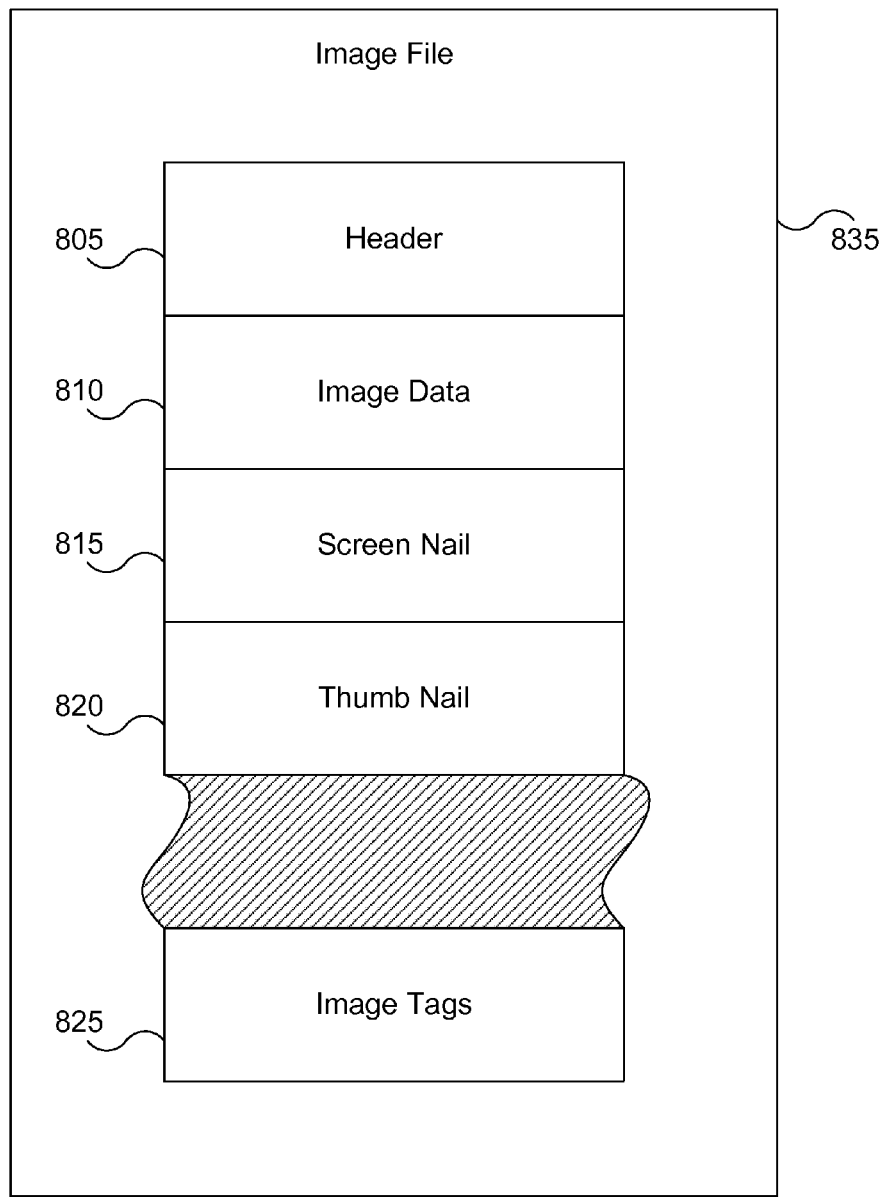
FIG. 8 is a diagram of one embodiment for an image file, in accordance with the present invention.

Referring now to FIG. 8, a diagram of one embodiment for an image file 835 is shown, in accordance with the present invention. In the FIG. 8 embodiment, image file 835 includes a header 805, image data 810, a screennail 815, a thumbnail 820, and image tags 825.

Header 805 preferably includes information that identifies and describes the various contents of image file 835. Image data 810 contains actual captured image data. Image data 810 exists in whichever format that is appropriate for the current location of image file 835 within the image processing chain of camera 110. Screennail 815 and thumbnail 820 are each different versions of image data 810 that have varying degrees of reduced resolution for a number of special viewing applications.

Image tags 825 includes various types of information that correspond and relate to particular captured image data 810. Image tags 825 are further discussed below in conjunction with FIG. 9.

Figure 9:
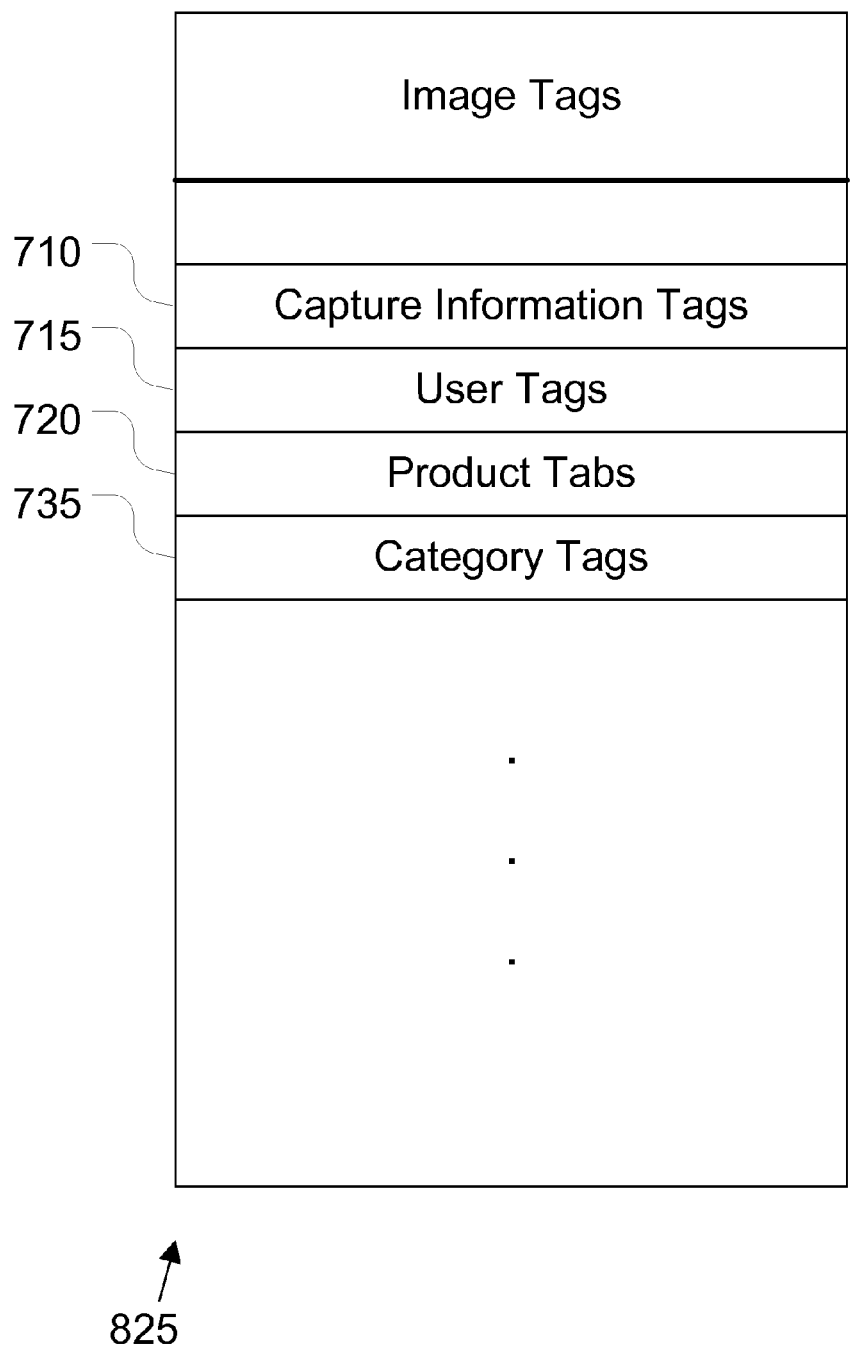
FIG. 9 is a diagram of one embodiment for the image tags of FIG. 8.

Referring now to FIG. 9, a diagram of one embodiment for the image tags of FIG. 8 is shown. In the FIG. 9 embodiment, image tags 825 include capture information tags 710, user tags 715, product tags 720, and category tags 735.

Capture information tags 710 preferably include various types of information that correlate with the captured image data 810 (FIG. 8). For example, capture information tags 710 may indicate focus setting, aperture setting, and other relevant information that may be useful for effectively processing or analyzing the corresponding image data 810. User tags 715 and product tags 720 typically contain various other information that may be needed for use with camera 110.

Category tags 735 are each preferably generated by analysis modules 540 after analysis modules 540 individually examine image data 810 from image file 835, in accordance with the present invention. Camera 110 may thus advantageously access and utilize category tags 735 to identify one or more categories to which a given set of image data 810 may likely relate. As discussed above in conjunction with FIG. 7, category tags 735 may correspond to a wide variety of possible image categories. In the preferred embodiment, image tags 825 initially contains sixteen empty locations to which various analysis modules 540 may write appropriate category tags 735 for automatically categorizing the corresponding image data 810, in accordance with the present invention.

Figure 10:
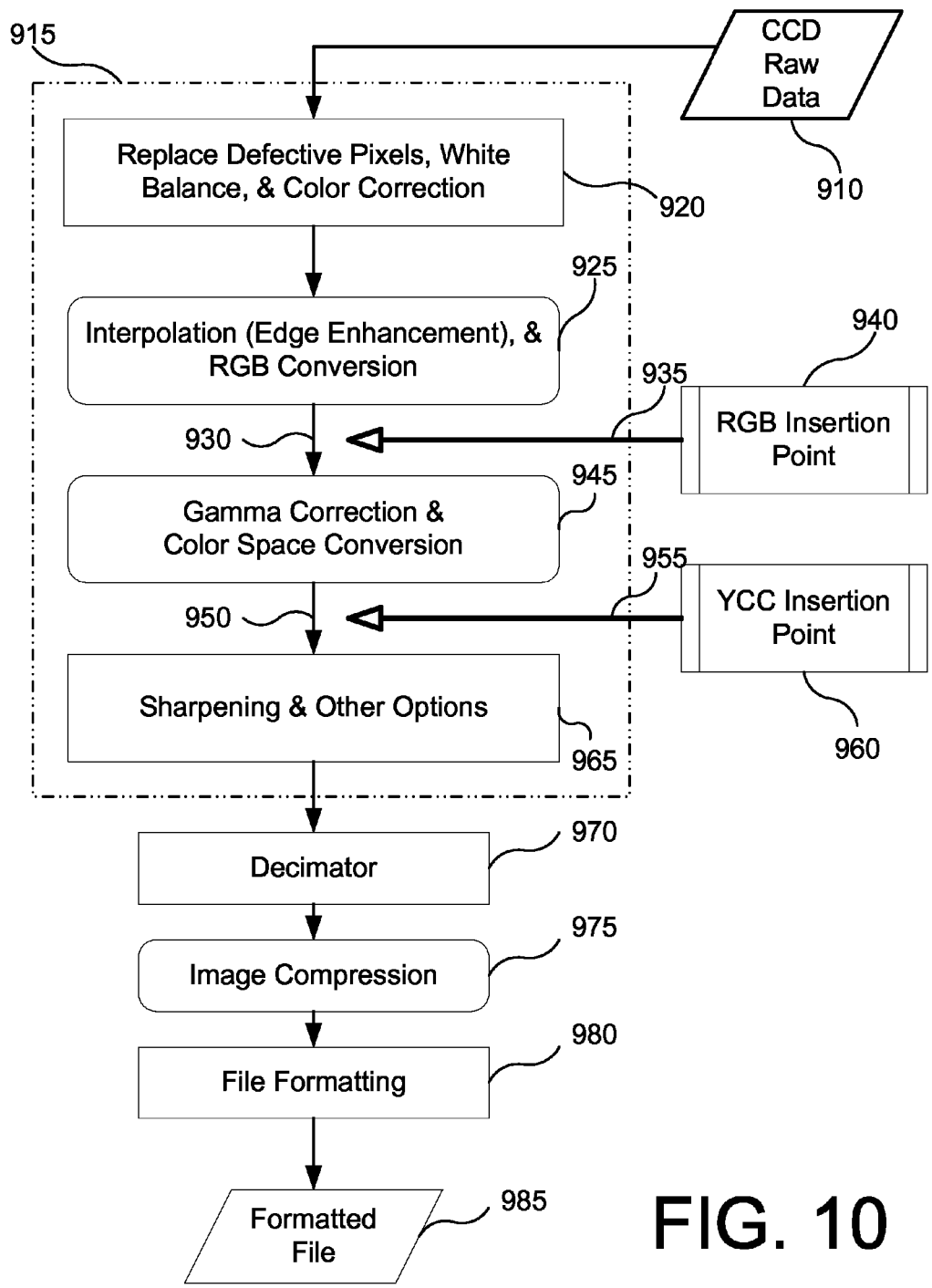
FIG. 10 is a flowchart for one embodiment of method steps to automatically analyze and categorize images, according to the present invention.
Figure 9:
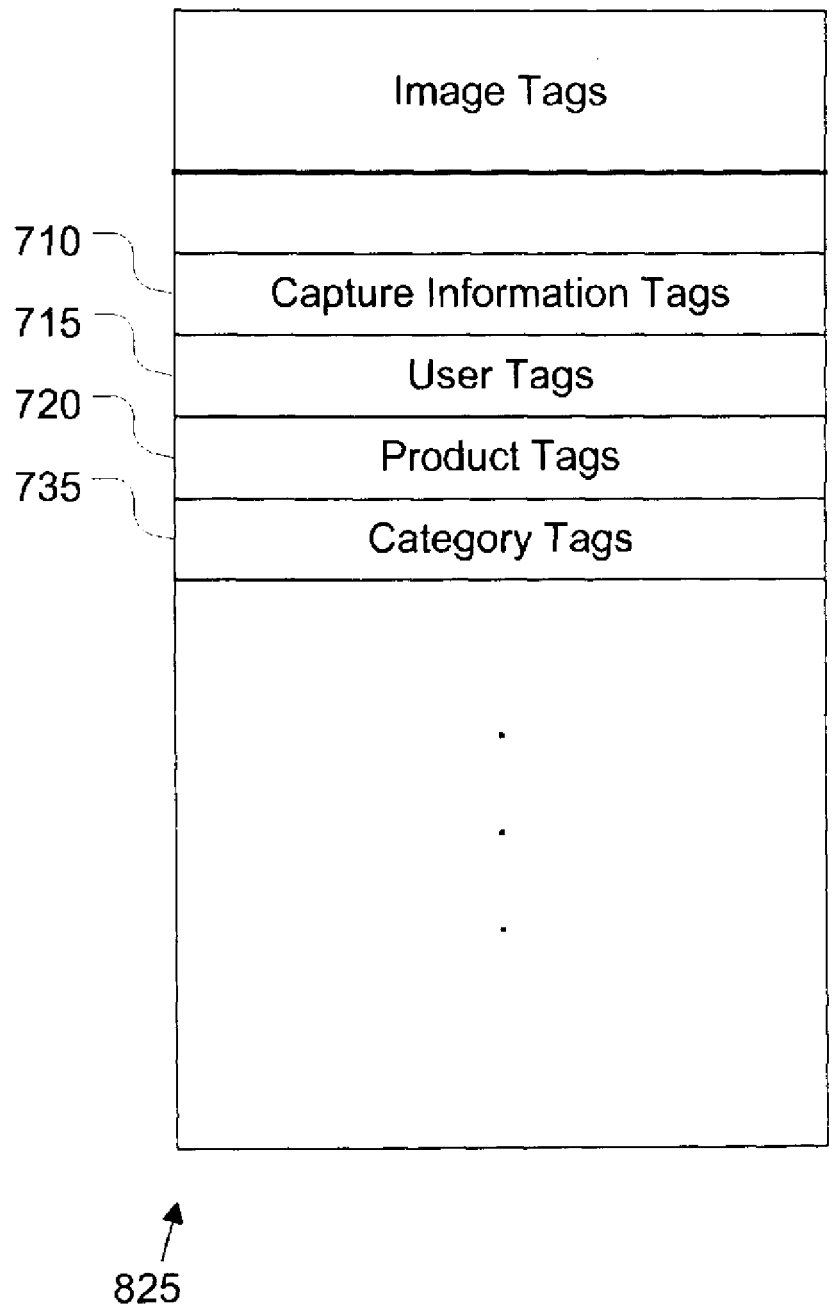

Referring now to FIG. 10, a flowchart is shown for one embodiment of method steps to automatically analyze and categorize images, according to the present invention. FIG. 10 also details the operation of a series of plug-in image processing modules 512 for processing and formatting image data 810. However, in other embodiments of camera 110, various other modules may readily be substituted or added to those modules discussed in below conjunction with the FIG. 10 embodiment.

Initially, in step 910, camera 110 preferably captures a selected image as CCD raw data, stores the raw data as image data 810 into image file 835, and then propagates image file 835 through camera 110 for processing and formatting of the image data 810. In step 920, an image processing module 512 preferably replaces any defective pixels in image data 810, and also performs white balance and color correction on image data 810.

Next, in step 925, another image processing module 512 preferably performs interpolation (edge enhancement) on image data 810, and then converts image data 810 into an intermediate format. In the preferred embodiment, step 925 converts image data 810 into an RGB (Red, Blue, Green) format.

In the FIG. 10 embodiment, following step 925, selected analysis modules 540 may be plugged into an RGB insertion point 940 to advantageously analyze image data 810 at RGB transition point 930, in accordance with the present invention. One, some, or all of the analysis modules 540 may analyze image data 810 at RGB transition point 930. Preferably, analysis modules 540 are selected for optimal compatibility and effectiveness with the current format of image data 810 at RGB transition point 930. Once a particular analysis module 540 analyzes the final line of image data 810, then that analysis module 540 preferably generates any appropriate category tags 735 and stores the generated category tags 735 into a blank category tag location in image file 835. Then, camera 110 may subsequently access the stored category tags 735 to automatically categorize and utilize the individual stored images (which each correspond to a separate image file 835).

Next, in step 945, another image processing module 512 preferably performs gamma correction and color space conversion on image data 810. During step 945, the image processing module 512 also preferably converts the color space format of image data 810. In the FIG. 10 embodiment, image data 810 is converted to YCC 444 (Luminance, Chrominance-red, and Chrominance-blue) format.

In the FIG. 10 embodiment, following step 945, selected analysis modules 540 may be plugged into a YCC insertion point 960 to analyze image data 810 at YCC transition point 950, in accordance with the present invention. One, some, or all of the analysis modules 540 may analyze image data 810 at YCC transition point 950. As discussed above, once a particular analysis module 540 analyzes the final line of image data 810, then that analysis module 540 preferably generates any appropriate category tags 735 and stores the generated category tags 735 into a blank category tag location in image file 835 for subsequent use by camera 110 to automatically categorize captured images.

This discussion of the FIG. 10 embodiment specifically refers only RGB insertion point 940 and YCC insertion point 960. However, in other embodiments of the present invention, analysis modules 540 may readily analyze image data 810 at any other time or insertion point within camera 110. For example, in an alternate embodiment, analysis modules 540 may readily be configured to examine image data 810 at capture time, and to specifically recognize and identify the capture of any image that matches one or more selectable parameters.

Furthermore, in another embodiment, analysis modules 540 may advantageously access image files 835 that have been processed and stored onto removable memory 354. Analysis modules 540 may then automatically categorize the image files 835 by analyzing image data 810 and responsively generating corresponding category tags 735, in accordance with the present invention.

In step 965, an image processing module 512 preferably performs a sharpening procedure on image data 810, and also may perform a variety of other processing options. Then, in step 970, an image processing module 512 preferably decimates image data 810. In the preferred embodiment, the decimation process reduces image resolution by decimating the YCC 444 image data to produce YCC 422 or YCC 411 image data.

In step 975, the image data 810 is preferably compressed into a final image format (preferably JPEG.) Next, in step 980, file formatter 516 preferably formats the compressed image file 835, and the resulting image file 835 is finally saved into removable memory 354 in step 985. As discussed above, image file 835 thus includes any appropriate category tags which camera 110 may then subsequently automatically access to sort selected images, in accordance with the present invention.

The invention has been explained above with reference to a preferred embodiment. Other embodiments will be apparent to those skilled in the art in light of this disclosure. For example, the present invention may readily be implemented using configurations other than those described in the preferred embodiment above. Additionally, the present invention may effectively be used in conjunction with systems other than the one described above as the preferred embodiment. Therefore, these and other variations upon the preferred embodiments are intended to be covered by the present invention, which is limited only by the appended claims.

What is claimed is:

1. A digital camera for automatically categorizing captured image data, the digital camera comprising:
   a processor within the digital camera for capturing image data;
   an analysis module within the digital camera coupled to the processor and configured to perform image data analysis on the captured image data at the time of image capture by the digital camera and to automatically generate, responsive to the preformed image data analysis, a category tag for the captured image data; and
   a memory for storing the generated category tag in association with the captured image data for categorizing the captured image data.

2. The digital camera of claim 1 wherein the analysis module includes an analysis algorithm for identifying the category tag for the captured image data.

3. The digital camera of claim 2 wherein the analysis module includes combination logic for combining analysis results from one or more analysis algorithms.

4. The digital camera of claim 1 wherein the analysis module includes parametric controls for controlling the analysis module.

5. The digital camera of claim 1 wherein the analysis module is selectively loaded into a volatile memory from a removable memory.

6. The digital camera of claim 1 further comprising a plurality of analysis modules.

7. The digital camera of claim 1 wherein the captured image data is stored in an individual image file.

8. The digital camera of claim 7 wherein the category tag is stored associated with the image data in the individual image file.

9. The digital camera of claim 7 wherein the category tag is stored associated with the image data but separate from the individual image file.

10. The digital camera of claim 1 wherein the analysis module is configured to recognize and label the captured image data that match predetermined criteria.

11. The digital camera of claim 1 wherein the analysis module is configured to access and categorize the captured image data after the captured image data has been processed and stored into the memory.

12. A method for automatically categorizing captured image data by a digital camera, the method comprising:
   capturing image data by the digital camera;
   performing image data analysis on the captured image data at the time of image capture by the digital camera;
   automatically generating, responsive to the preformed image data analysis, a category tag for the captured image data; and
   storing the generated category tag in association with the captured image data for categorizing the captured image data.

13. The method of claim 12 wherein performing image data analysis on the captured image data includes identifying via an analysis algorithm the category tag for the captured image data.

14. The method of claim 13 wherein performing image data analysis on the captured image data combining analysis results from one or more analysis algorithms.

15. The method of claim 12 wherein performing image data analysis on the captured image data includes controlling an analysis module with parametric controls.

16. The method of claim 12 comprising selectively loading an analysis module into a volatile memory from a removable memory.

17. The method of claim 12 wherein performing image data analysis on the captured image data includes performing image data analysis by a plurality of analysis modules.

18. The method of claim 12 wherein storing the generated category tag in association with the captured image data includes storing the captured image data in an individual image file.

19. The method of claim 18 wherein the category tag is stored associated with the image data in the individual image file.

20. The method of claim 18 wherein the category tag is stored associated with the image data but separate from the individual image file.

21. The method of claim 12 wherein performing image data analysis on the captured image data includes recognizing and labeling the captured image data that match predetermined criteria.

22. The method of claim 12 wherein performing image data analysis on the captured image data includes accessing and categorizing the captured image data after the captured image data has been processed and stored into a memory.

23. A digital camera for automatically categorizing captured image data, the digital camera comprising:
   means for capturing image data by the digital camera;
   means for performing image data analysis on the captured image data at the time of image capture by the digital camera and automatically generating, responsive to the preformed image data analysis, a category tag for the captured image data; and
   means for storing the generated category tag in association with the captured image data for categorizing the captured image data.

24. A computer-readable medium comprising program instructions for automatically categorizing image data with a digital camera, the program instructions comprising:
   capturing image data by the digital camera;
   performing image data analysis on the captured image data at the time of image capture by the digital camera;
   automatically generating, responsive to the preformed image data analysis, a category tag for the captured image data; and
   storing the generated category tag in association with the captured image data for categorizing the captured image data.

25. The digital camera of claim 1 wherein the analysis module is configured to perform the image data analysis on the captured image data prior to compression of the captured image data.

26. The digital camera of claim 1 wherein the analysis module is configured to perform the image data analysis on the captured image data after compression of the captured image data.

27. The method of claim 12 wherein performing image data analysis on the captured image data includes performing image data analysis on the captured image data prior to compression of the captured image data.

28. The method of claim 12 wherein performing image data analysis on the captured image data includes performing image data analysis on the captured image data after compression of the captured image data.

* * * * *

UNITED STATES PATENT AND TRADEMARK OFFICE
CERTIFICATE OF CORRECTION

| | | |
|---|---|---|
| PATENT NO. | : 8,350,928 B2 | |
| APPLICATION NO. | : 12/576702 | |
| DATED | : January 8, 2013 | |
| INVENTOR(S) | : Anderson | |

It is certified that error appears in the above-identified patent and that said Letters Patent is hereby corrected as shown below:

On Title Page 2, in Item (56), under "OTHER PUBLICATIONS", in Column 2, Line 8, delete "al." and insert -- al., --, therefor.

In the Drawings

Fig. 9 should be replaced with the corrected Fig. 9 as shown on the attached page.

Fig. 9, Sheet 9 of 10, for Tag "720", in Line 1, delete "Tabs" and insert -- Tags --, therefor.

In the Specifications

Column 4, Lines 10-20, delete "Imaging capture.........computer 118." and insert the same at Line 11, as a new paragraph.

In the Claims

Column 9, Line 12, in Claim 1, delete "preformed" and insert -- performed --, therefor.

Column 9, Line 51, in Claim 12, delete "preformed" and insert -- performed --, therefor.

Column 10, Line 31, in Claim 23, delete "preformed" and insert -- performed --, therefor.

Column 10, Line 42, in Claim 24, delete "preformed" and insert -- performed --, therefor.

Signed and Sealed this
Eighteenth Day of March, 2014

Michelle K. Lee
*Deputy Director of the United States Patent and Trademark Office*

UNITED STATES PATENT AND TRADEMARK OFFICE
CERTIFICATE OF CORRECTION

PATENT NO. : 8,350,928 B2  
APPLICATION NO. : 12/576702  
DATED : January 8, 2013  
INVENTOR(S) : Anderson Page 1 of 1

It is certified that error appears in the above-identified patent and that said Letters Patent is hereby corrected as shown below:

On the Title Page, in Item [73], under "Assignee", in Column 1, Line 1, delete "Deisgns" and insert -- Designs --, therefor.

Signed and Sealed this
Fourteenth Day of October, 2014

Michelle K. Lee
*Deputy Director of the United States Patent and Trademark Office*